April 16, 1957 J. H. SCHARF 2,788,684
DRILLING JIG
Filed April 8, 1953
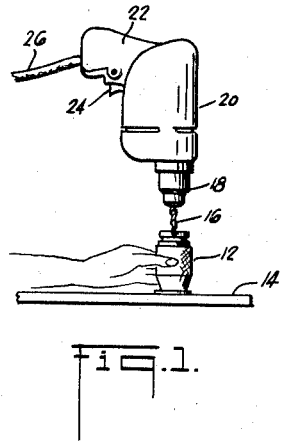
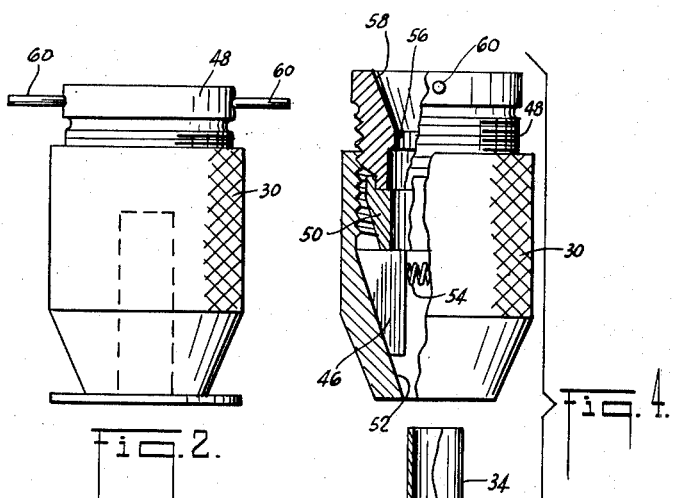
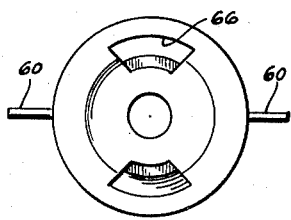
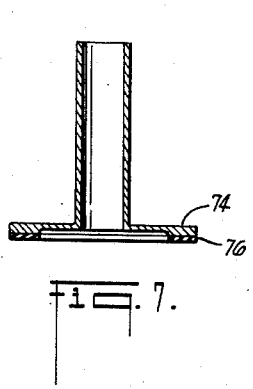
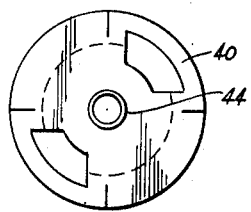
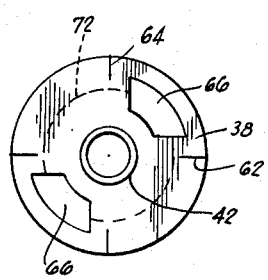
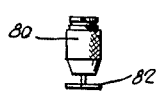
INVENTOR.
JOHN H. SCHARF
BY
*James and Franklin*
ATTORNEYS

United States Patent Office 2,788,684
Patented Apr. 16, 1957

2,788,684

DRILLING JIG

John H. Scharf, New York, N. Y.

Application April 8, 1953, Serial No. 347,470

8 Claims. (Cl. 77—62)

This invention relates to drilling jigs, and more particularly to a hand-held drilling jig to help insure perpendicularity.

When drilling a hole without a guide by means of a portable or hand-held drill it is difficult to insure perpendicularity of the hole to the surface. If the hole is to mate with another to receive a dowel or bolt in order to hold two pieces together, the lack of alignment may spoil the work. A drill press will insure perpendicularity, but is not portable and may not be available, or in many cases the work is immovable or is too large and cumbersome to be brought to the drill press.

Commercial jigs called "dowel jigs" are already known but these require clamping the jig to the work. They will permit drilling a hole in the edge of a board rather than through the flat surface of a board. They are accordingly of only limited utility, apart from taking considerable time to set up, adjust and use.

The primary object of the present invention is to generally improve drilling jigs, and to provide a small, readily portable jig which is useable with a hand-held drill. A more particular object is to provide a drilling jig which will insure perpendicularity to the surface through which the drill is being operated. Still another object is to provide a jig which will help locate the resulting hole in desired position without necessitating clamping of the jig. Still another object is to provide a drilling jig which is adapted to work on a large flat surface. A still further object is to provide a jig which is adapted to take different bit sizes.

A further object is to facilitate the escape of shavings or chips cut by the bit. A still further object is to provide a drilling jig which may be used also as a depth gauge.

To accomplish the foregoing objects, and other more specific objects which will hereinafter appear, my invention resides in the drilling jig elements, and their relation one to another, as are hereinafter more completely described in the following specification. The specification is accompanied by a drawing, in which:

Fig. 1 is explanatory of the method of using my jig;

Fig. 2 is a front elevation of a jig embodying features of my invention;

Fig. 3 is a bottom view thereof;

Fig. 4 is a partially sectioned elevation similar to Fig. 2 but showing the guide separated from the chuck;

Fig. 5 is a plan view of the guide shown in Fig. 4;

Fig. 6 is a similar view showing a similar guide designed for use with a bit of different diameter;

Fig. 7 is a section through a modification; and

Fig. 8 is explanatory of how the jig may be used as a depth gauge.

Referring to the drawing, and more particularly to Fig. 1, the drilling jig 12 is shown hand-held on the flat surface of a board 14 or other piece of work through which a hole is to be bored. The drilling operation itself is performed by a bit 16 received in the chuck 18 of a portable or hand-held power drill 20. This may be of conventional construction and is provided with the usual pistol-grip handle 22 and trigger-like control switch 24. The drill is powered through a flexible cord 26.

Referring now to Fig. 4, the complete jig comprises a chuck 30 and a guide 32. The guide has a tube 34 and a relatively large diameter flange 36 fixedly secured to one end of the tube in perpendicular relation thereto.

The guide 32 is one of a series of guides with tubes having inside diameters mating with desired bits. This will be seen by comparing Figs. 5 and 6 which show guides having similar flanges 38 and 40, but with tubes 42 and 44 which are different in diameter, and obviously intended to mate with bits of different diameter.

Reverting now to Fig. 4, the chuck 30 is a relatively weighty chuck having conventional jaws 46 to receive and clamp the tube 34 of the guide. The outside of the chuck is preferably knurled, as shown, to facilitate holding the same during the drilling operation.

The chuck is conventional in having a screw portion 48 which bears downward on a collar 50, which in turn pushes the jaws 46 downward along the convergent or conical inside surface 52 of the chuck, thereby closing the jaws as the screw 48 is turned into the outer body of the chuck. When the screw is retracted the jaws are spread by reason of compression springs 54 which are disposed around the inside periphery of the chuck between the jaws. It will be understood that the jaw action of the chuck is not per se a part of the present invention, and any of the known conventional jaw actions may be employed for the purpose of my invention.

The screw 48 differs from the conventional screw in being centrally hollowed, as shown at 56, to a diameter greater than the maximum bit size to be handled by the jig. Indeed the centrally hollow portion is preferably made to diverge upwardly, as shown at 58, in order to help clear the lower end of the drill chuck holding a bit being used with the jig. This helps utilize a greater length of the bit than would otherwise be the case.

To facilitate tightening of the chuck 30 the screw 48 has means accessible at the outside to help grasp and turn the same. In the present case this takes the form of capstan rods 60 projecting outward in diametrical relation, as is best shown in Figs. 2 and 3. It will be evident that by holding the knurled body of the chuck in one hand and the capstan bars in the other, the chuck may be tightened securely around the outside of the tube 34 of the guide 32, thus quickly forming a rigid assembly somewhat as shown in Figs. 2 and 3. Thus the guide, of which a series of different sizes is required, may be made of comparatively light metal and inexpensively. The guide by itself might help insure perpendicularity but would be exceedingly difficult to hold. The chuck lends body and weight, and provides an assembly which is easy to hold. Only a single chuck is needed for use with an entire series of guides.

Referring now to Fig. 5, it will be seen that the top surface of the flange 38 is preferably provided with diametrical lines 62 and 64. These are disposed at right angles to one another and intersect at the axis of the guide. Inasmuch as the location of a desired hole is usually indicated by drawing two perpendicularly crossed lines, it is an easy matter to properly locate the chuck by simply holding the scored lines 62 and 64 in registration with the crossed lines previously drawn on the surface of the board. Similar crossed lines are provided on each of the guides, as will be seen by reference to Fig. 6.

In Fig. 5 attention is drawn to the openings or window 66. In Fig. 4 it will be seen that the bottom surface of flange 36 is preferably raised or hollowed somewhat, as shown at 70. The same applies to the flange 38 in Fig. 5, the rim of the hollowed portion being represented by the dotted line 72. The resulting passage facilitate the escape of shavings or fragments cut by the bit.

Referring now to Fig. 7, I there show a modification of the invention in which the peripheral portion of the flange 74 is surfaced at the bottom with a frictional material indicated at 76. This may be a thin flat ring of rubber, or other suitable frictional coating which will help prevent sliding movement of the jig. Flange 74 has windows, not shown, with the same function as the windows 66 in Fig. 5. If desired the flange may be made of uniform thickness, and the added ring 76 may be used for the purpose of providing the clearance shown at 70 in Fig. 4. The frictional material is strongly adhered to the metal.

Referring now to Fig. 8, the jig may be additionally employed as a depth gauge, and for this purpose it is merely necessary to tighten the chuck 80 on the guide 82 at a point elevated somewhat from the flange, the elevation being so selected that when the drill chuck reaches its down limit against the top end of the jig, the projection of the drill bit below the bottom of the guide will correspond to the desired depth of hole. This may be done by first placing the chuck 80 and the guide 82, while loose from one another, over the bit as far as they will go, and then moving the guide outward on the bit until the desired length of bit projects from the guide, and thereupon tightening the chuck on the guide.

In one practical case most of the chuck parts are those of a standard ½" chuck. The guides are dimensioned to receive bit sizes such as 3/16", ¼", etc., on up to ⅜". The thickness of the material of the guide may be 1/16". The height of the guide may be 1½" or 2". The diameter of the flange may be say 1½". The inside diameter or bore of the tube is preferably slightly larger than the bit size, say 0.010", for clearance and for tolerance in the bit size. It will be understood that these dimensions are given solely by way of illustration of an example of the invention, and are not intended to be in limitation of the invention.

It is believed that the construction and method of use of my improved drilling jig, as well as the advantages thereof, will be apparent from the foregoing detailed description. It is a hand tool which can be applied anywhere, even on an extensive flat surface, and regardless of whether the surface is horizontal or perpendicular, etc. The jig insures perpendicularity of the hole. It helps properly locate the hole relative to crossed center lines on the surface. It may be used as a depth gauge as well as a jig. It requires no clamping or other fixed mounting on the surface. The chuck portion of the jig may be made inexpensively, and is dependable in action, because most of the parts, including the jaws and the cap, etc., are those already standardized in drill chucks. The arbor is centrally hollowed to accommodate the bit and preferably also the lower end of the drill chuck. Tightening of the hollow arbor is facilitated by the addition of external means such as capstan bars. The construction of the chuck itself insures coaxially of the chuck and guide, but any error in this respect will not affect the accuracy of the location of the hole because the quadrant lines are on the guide itself, so that the chuck acts merely as a weighting and holding means. If the depth of hole is greater than the available length of bit the hole may be started in true perpendicular relation with the aid of the jig, and then after the bit has been carried down as far as it will go it may be withdrawn, the jig removed, and the hole continued without the jig, for the accuracy of the first part of the hole will help insure continued accuracy. In this connection it may be mentioned that in the case of small diameter bits they may be purchased with a longer shank instead of a standard shank.

In respect to the parts of the chuck, it will be noted in Fig. 4 that the lower end of the screw 48 and the upper end of the collar 50 are matingly grooved or stepped to fit together, and further, that these parts might be made integral instead of separate. It may also be observed that the outer wall of the collar 50 has a taper which parallels the taper of the inside of the convergent or conical portion of the chuck, so that the collar will ride quite far into the chuck without obstruction.

It will be understood that while I have shown and described my invention in a preferred form, changes may be made in the structure shown without departing from the scope of the invention, as sought to be defined in the following claims.

I claim:

1. A drilling jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outside of the chuck being knurled to facilitate holding the same, and the usual internally threaded screw portion of the chuck being cut away and centrally hollowed to a diameter greater than the maximum bit size to be handled by the jig.

2. A drilling jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outside of the chuck being knurled to facilitate holding the same, and the usual internally threaded screw portion of the chuck being cut away and centrally hollowed to a diameter greater than the maximum bit size to be handled by the jig, the top surface of the flange having diametrical lines disposed at right angles to one another to help center or properly locate the jig.

3. A drilling jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outside of the chuck being knurled to facilitate holding the same, and the usual internally threaded screw portion of the chuck being cut away and centrally hollowed to a diameter greater than the maximum bit size to be handled by the jig, the flange of the guide having windows cut therethrough to facilitate the escape of shavings or fragments cut by the bit.

4. A drilling jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outside of the chuck being knurled to facilitate holding the same, and the usual internally threaded screw portion of the chuck being cut away and centrally hollowed to a diamteer greater than the maixmum bit size to be handled by the jig, the bottom surface of the flange being coated with a frictional material to help prevent sliding movement thereof.

5. A drilling jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outside of the chuck being knurled to facilitate holding the same, and the usual internally threaded screw portion of the chuck being cut away and centrally hollowed to a diameter greater than the maximum bit size to be handled by the jig, most of the bottom surface of the flange of the guide being raised or offset upwardly within the periphery of the flange to facilitate the escape of shavings or fragments cut by the bit.

6. A drilling jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outside of the chuck being knurled to facilitate holding the same, and the usual internally threaded screw portion of the chuck being cut away and centrally hollowed to a diameter greater than the maximum bit size to be handled by the jig, most of the bottom surface of the flange of the guide being raised or offset upwardly within the periphery of the flange, and the flange having windows cut therethrough to facilitate the escape of shavings or fragments cut by the bit.

7. A drilling jig for use with a conventional drill including a conventional bit held in and driven by a conventional chuck, said jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outside of the chuck being knurled to facilitate holding the same, the usual internally threaded screw portion of the chuck being cut away and centrally hollowed to a diameter greater than the maximum bit size to be handled by the jig, and said central hollow diverging upwardly to help clear the lower end of the conventional drill chuck holding the bit.

8. A drilling jig comprising a chuck and a guide, said guide having a tube and a relatively large diameter flange fixedly secured to one end of the tube in perpendicular relation thereto, said flange having a diameter many times the diameter of the tube, said guide being one of a series of guides with tubes having inside diameters mating with desired bits, said chuck being a relatively weighty chuck having jaws to receive and clamp the tube portion of the guide, said flange being outside the outer end of the chuck and being adapted to rest on the surface of the work which is to be drilled, the outer portion of the chuck being knurled to facilitate holding the same, the usual internally threaded screw portion of the inner portion of the chuck being cut away and centrally hollowed to a diameter greater than the maximum bit size to be handled by the jig, and having a means which is accessible at the outside to facilitate tightening the said inner portion of the chuck relative to the knurled outer portion of the chuck.

References Cited in the file of this patent

UNITED STATES PATENTS

| | | |
|---|---|---|
| 482,616 | Buck | Sept. 13, 1892 |
| 1,073,362 | Redeker | Sept. 16, 1913 |
| 1,403,149 | De Toni | Jan. 10, 1922 |
| 2,224,480 | Kartarik | Dec. 10, 1940 |
| 2,353,295 | Day | July 11, 1944 |
| 2,360,942 | Ellerstein | Oct. 24, 1944 |
| 2,428,201 | Cannarili et al. | Sept. 30, 1947 |
| 2,488,279 | Fitzmaurice | Nov. 15, 1949 |
| 2,708,972 | Park | May 24, 1955 |

FOREIGN PATENTS

| | | |
|---|---|---|
| 636,815 | Great Britain | May 10, 1950 |